United States Patent
Guiassa

(10) Patent No.: US 12,346,091 B2
(45) Date of Patent: Jul. 1, 2025

(54) METHOD OF MANUFACTURING A PART OF AN AIRCRAFT ENGINE

(71) Applicant: PRATT & WHITNEY CANADA CORP., Longueuil (CA)

(72) Inventor: Rachid Guiassa, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 236 days.

(21) Appl. No.: 17/530,685

(22) Filed: Nov. 19, 2021

(65) Prior Publication Data

US 2023/0158590 A1    May 25, 2023

(51) Int. Cl.
| | | |
|---|---|---|
| G05B 19/41 | (2006.01) | |
| G05B 19/18 | (2006.01) | |
| G05B 19/401 | (2006.01) | |
| G05B 19/404 | (2006.01) | |

(52) U.S. Cl.
CPC ........... *G05B 19/41* (2013.01); *G05B 19/186* (2013.01); *G05B 19/401* (2013.01); *G05B 19/404* (2013.01); *B23P 2700/01* (2013.01); *G05B 2219/36063* (2013.01); *G05B 2219/37198* (2013.01); *G05B 2219/50252* (2013.01)

(58) Field of Classification Search
None
See application file for complete search history.

(56) References Cited

U.S. PATENT DOCUMENTS

| | | | |
|---|---|---|---|
| 4,382,215 A * | 5/1983 | Barlow | .............. G05B 19/4015 700/192 |
| 5,297,055 A | 3/1994 | Johnstone | |
| 6,256,546 B1 | 7/2001 | Graham et al. | |
| 8,858,297 B2 | 10/2014 | Yanase | |
| 10,639,734 B2 | 5/2020 | Ferry et al. | |
| 10,702,936 B2 | 7/2020 | Weber | |

(Continued)

FOREIGN PATENT DOCUMENTS

WO    2016188842    12/2012

OTHER PUBLICATIONS

T. R. Kramer, "Automatic generation of NC-code for hole cutting with in-process metrology," 6th IEEE Conference Record., Instrumentation and Measurement Technology Conference, Washington, DC, USA, 1989, pp. 45-52 (Year: 1989).*

(Continued)

*Primary Examiner* — Ryan A Jarrett
(74) *Attorney, Agent, or Firm* — NORTON ROSE FULBRIGHT CANADA LLP

(57) ABSTRACT

A method of manufacturing a feature in a part with a cutting tool, includes machining a semi-finished shape of the feature, determining an actual position of at least one target point on a surface of the semi-finished shape, and computing a difference between the determined position of the at least one target point and a nominal position of the at least one target point on a digitized model of the part having the semi-finished shape of the feature. As a function of the difference, a correction to a position of the cutting tool on a nominal tool path to achieve the final shape of the feature from the semi-finished shape is determined, and the correction is used to define a corrected tool path. The finished shape of the feature is then machined with the cutting tool by moving the cutting tool along the corrected tool path.

20 Claims, 8 Drawing Sheets

(56) References Cited

U.S. PATENT DOCUMENTS

2006/0181236 A1    8/2006   Brogardh
2009/0064518 A1    3/2009   Finkenwirth et al.
2009/0112357 A1    4/2009   Hammond et al.
2012/0215352 A1    8/2012   Eberst
2015/0292979 A1   10/2015   Rayer

OTHER PUBLICATIONS

European Search report issued on Mar. 16, 2023 for corresponding application No. 22207854.5.

\* cited by examiner

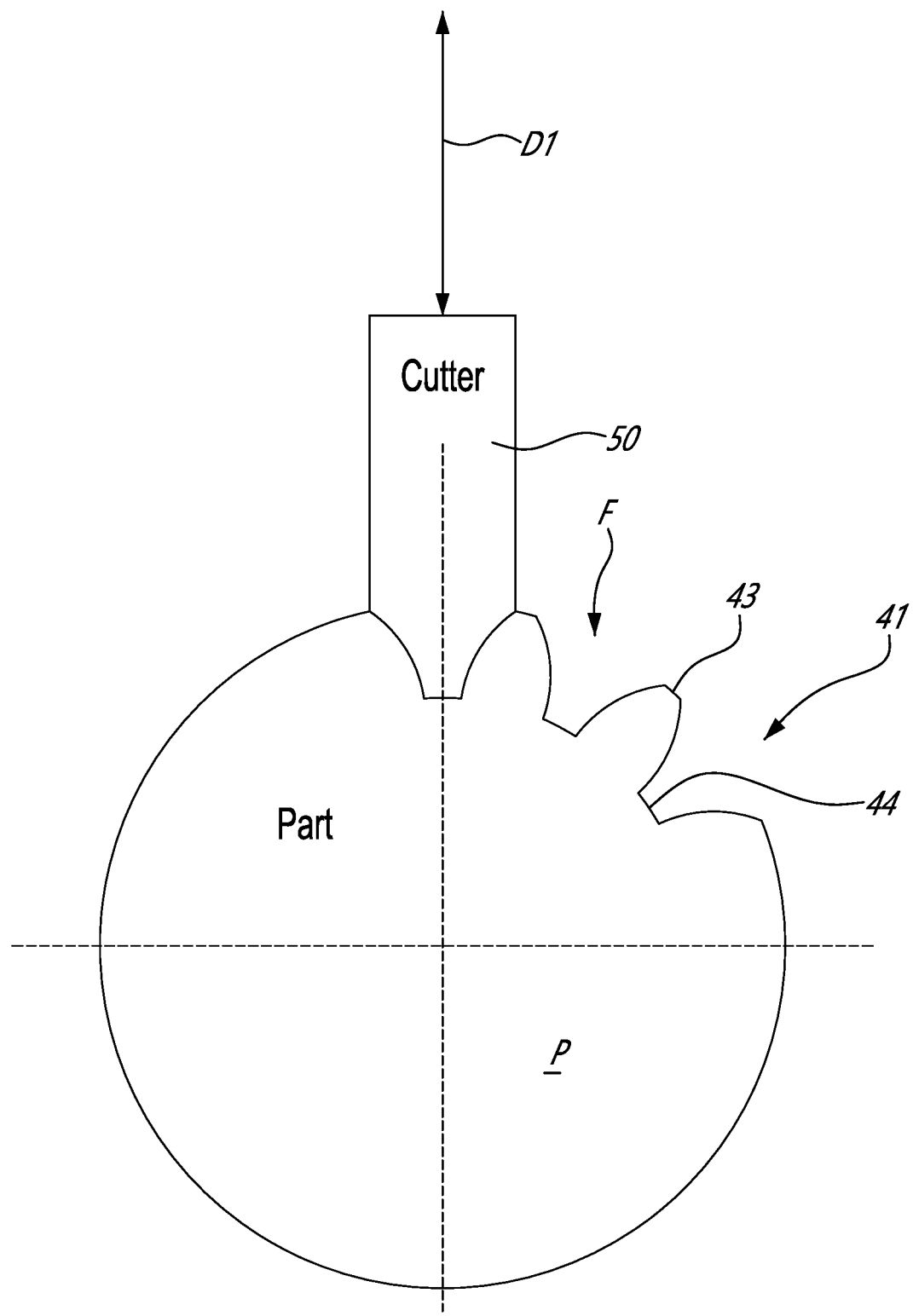

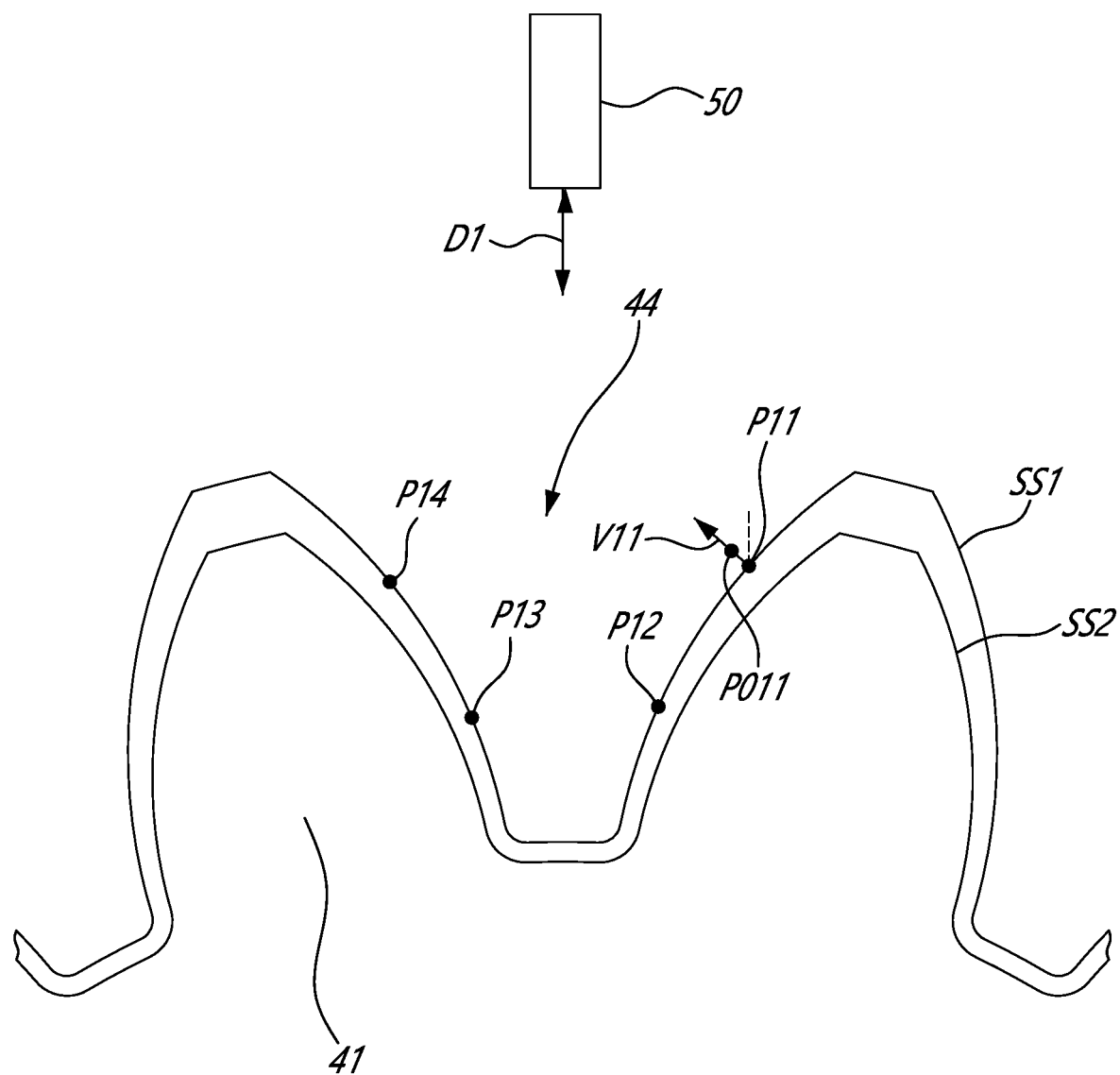

METHOD OF MANUFACTURING A PART OF AN AIRCRAFT ENGINE

TECHNICAL FIELD

The disclosure relates generally to aircraft engines, such as gas turbine engines, and, more particularly, to systems and methods used for manufacturing parts of such aircraft engines by machining.

BACKGROUND

Aircraft engines include a plurality of components that may be manufactured by machining. As an example, turbine discs are typically engaged to a shaft via a spline coupling. Such spline couplings include mating splines in both the shaft and turbine disc. The splines include teeth and grooves, which may be machined with a rotating tool that has a shape corresponding to a profile of the teeth. During the machining process, however, variances between an expected position of the rotating tool in relationship to the part being machined and its actual position can sometimes occur. This may result in manufacturing discrepancies that are undesired. Improvements are therefore sought.

SUMMARY

In one aspect, there is provided a method of manufacturing a feature in a part of an aircraft engine with a cutting tool, comprising: machining a semi-finished shape of the feature in a stock material of the part by moving the cutting tool relative to the stock material; determining an actual position of at least one target point on a surface of the semi-finished shape of the feature, the surface to be machined to achieve a final shape of the feature; computing a difference between the determined position of the at least one target point and a nominal position of the at least one target point on a digitized model of the part having the semi-finished shape of the feature; as a function of the difference, determining a correction to a position of the cutting tool on a nominal tool path to achieve the final shape of the feature from the semi-finished shape, and using the correction to define a corrected tool path; and machining the finished shape of the feature with the cutting tool by moving the cutting tool along the corrected tool path.

The method may also include one or more of the following features/steps, in whole or in part, and in any combination.

In some embodiments, the determining of the correction includes determining the correction from a compensation table listing correction values to apply to the position of the cutting tool associated with difference values between actual and nominal positions of the at least one target point.

In some embodiments, for each of the at least one target point, the method comprises generating the compensation table by: determining a vector normal to the surface of the semi-finished shape of the feature at the at least one target point from the digitized model of the part having the semi-finished shape of the feature; and for each of the difference values taken along the vector normal to the surface, determining the correction values as a function of a projection of the vector onto each directions of movement of the cutting tool.

In some embodiments, the determining of the correction includes determining the correction by interpolation from the compensation table.

In some embodiments, the determining of the actual position of the at least one target point includes determining the actual position of the at least one target point with a probe.

In some embodiments, the probe is substituted for the cutting tool in a tool holder of a cutting machine.

In some embodiments, the feature is a groove in a member of a spline connection, the machining of the semi-finished of the feature includes moving the cutting tool in a radial direction relative to a longitudinal axis of the member of the spline connection.

In some embodiments, the determining of the correction of the position of the cutting tool includes determining the correction of a movement of the cutting tool along the radial direction as a function of the difference between the determined position of the at least one target point and the nominal position of the at least one target point.

In some embodiments, the determining of the correction includes determining the correction as a function of a distance between the determined position of the at least one target point and the nominal position of the at least one target point along a vector normal to the surface of the semi-finished shape at the at least one target point and as a function of an angle between the vector and the radial direction.

In some embodiments, the machining of the finished shape includes moving the cutting tool in the radial direction along a corrected depth in the stock material, the corrected depth corresponding to a nominal depth corrected by the correction.

In another aspect, there is provided a cutting machine comprising: a tool holder holding a cutting tool; and a controller having a processing unit and a computer readable medium having instructions stored thereon executable by the processing unit for: machining a semi-finished shape of a feature in a stock material of a part by moving the cutting tool relative to the stock material; determining an actual position of at least one target point on a surface of the semi-finished shape of the feature, the surface to be machined to achieve a final shape of the feature; computing a difference between the determined position of the at least one target point and a nominal position of the at least one target point on a digitized model of the part having the semi-finished shape of the feature; as a function of the difference, determining a correction to a position of the cutting tool on a nominal tool path to achieve the final shape of the feature from the semi-finished shape, and using the correction to define a corrected tool path; and machining the finished shape of the feature with the cutting tool by moving the cutting tool along the corrected tool path.

The cutting machine may also include one or more of the following features, in whole or in part, and in any combination.

In some embodiments, the determining of the correction includes determining the correction from a compensation table listing correction values to apply to the position of the cutting tool associated with difference values between actual and nominal positions of the at least one target point.

In some embodiments, for each of the at least one target point, the compensation table is generated by: determining a vector normal to the surface of the semi-finished shape of the feature at the at least one target point from the digitized model of the part having the semi-finished shape of the feature; and for each of the difference values taken along the vector normal to the surface, determining the correction values as a function of a projection of the vector onto each directions of movement of the cutting tool.

In some embodiments, the determining of the correction includes determining the correction by interpolation from the compensation table.

In some embodiments, the determining of the actual position of the at least one target point includes determining the actual position of the at least one target point with a probe.

In some embodiments, the probe is substituted for the cutting tool in a tool holder of the cutting machine.

In some embodiments, the feature is a groove in a member of a spline connection, the machining of the semi-finished of the feature includes moving the cutting tool in a radial direction relative to a central axis of the member of the spline connection.

In some embodiments, the determining of the correction of the position of the cutting tool includes determining the correction of a movement of the cutting tool along the radial direction as a function of the difference between the determined position of the at least one target point and the nominal position of the at least one target point.

In some embodiments, the determining of the correction includes determining the correction as a function of a distance between the determined position of the at least one target point and the nominal position of the at least one target point along a vector normal to the surface of the semi-finished shape at the at least one target point and as a function of an angle between the vector and the radial direction.

In some embodiments, the machining of the finished shape includes moving the cutting tool in the radial direction along a corrected depth in the stock material, the corrected depth corresponding to a nominal depth corrected by the correction.

BRIEF DESCRIPTION OF THE DRAWINGS

Reference is now made to the accompanying figures in which:

FIG. 7 is a cross-sectional view of a male member of the spline connection of FIG. 6 with a cutting tool used to manufacture grooves in the male member; and FIG. 8 is a cross-sectional view of a portion of the male member illustrating semi-finished and finished shapes of an outer groove of the male member of the spline connection.

DETAILED DESCRIPTION

Figure 1:
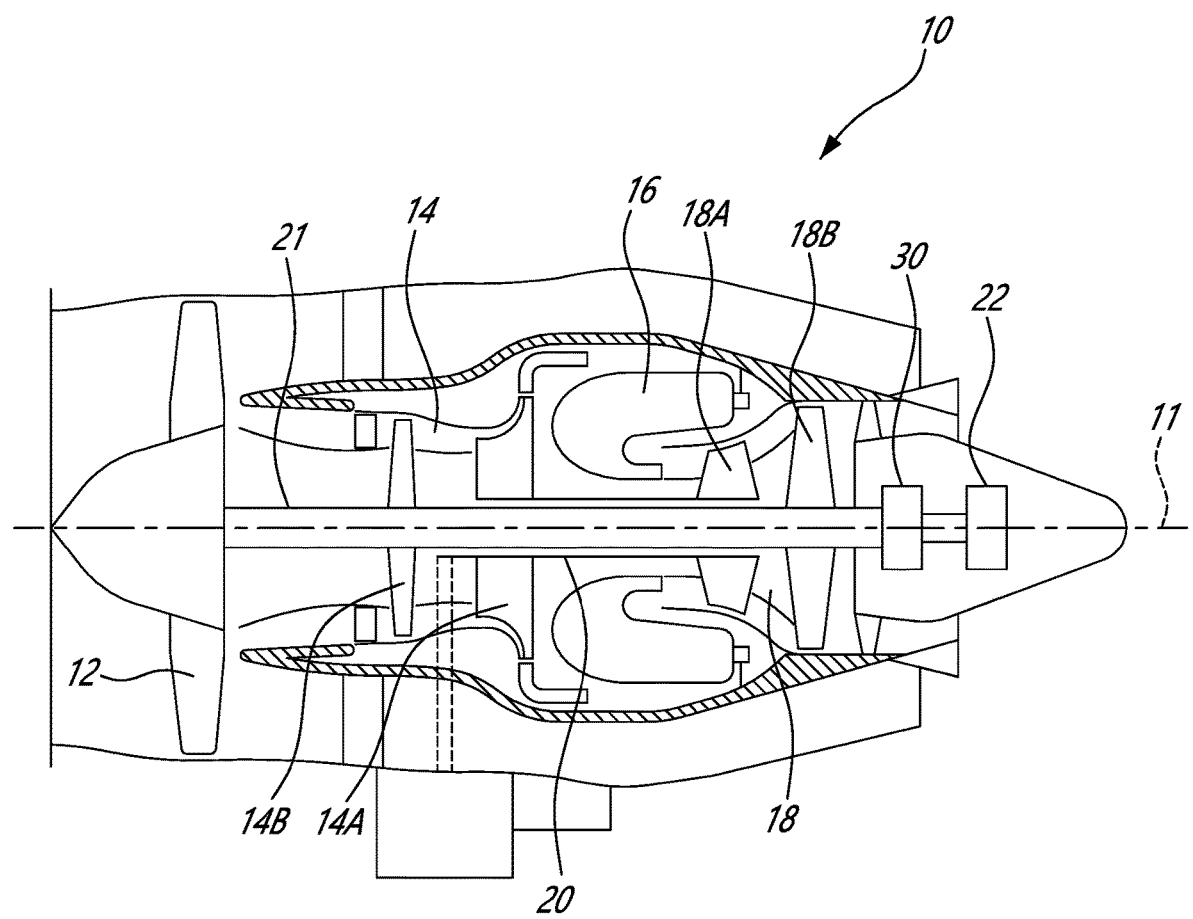
FIG. 1 is a schematic cross-sectional view of an aircraft engine depicted as a gas turbine engine in accordance with one embodiment.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure. In the embodiment shown, an accessory 22, which may be a generator, is drivingly engaged to the low-pressure shaft 21 via a gearbox 30.

Different parts of the gas turbine engine 10 may be manufactured following a machining process. However, some shapes may be complicated to machine. The machining precision of specific form, such as spline profile, gear shaping may be challenging. In some cases, manufacturing tolerances, offset between the actual and expected positions of a cutting tool, and so on may create discrepancies between the desired shape of the part and the actual shape of the part obtained after machining. Because of the complexity of the calculation, there may be no direct calculation of profile characteristics using probing devices inside the manufacturing center while the part is clamped. The measurement data may need to be processed externally to compute these characteristics. This may be time consuming. The precision of the obtained surface after machining using the cutting tool may be affected by two major sources. First, the cutter shape form defect. This may be improved using cutter grinder or cutter production process to have cutter with acceptable shape. Second, is the cutter position. This related to the process such as setup and tool positioning. This can be corrected during the process by adjusting the position of the cutter relative to the part.

Figure 2:
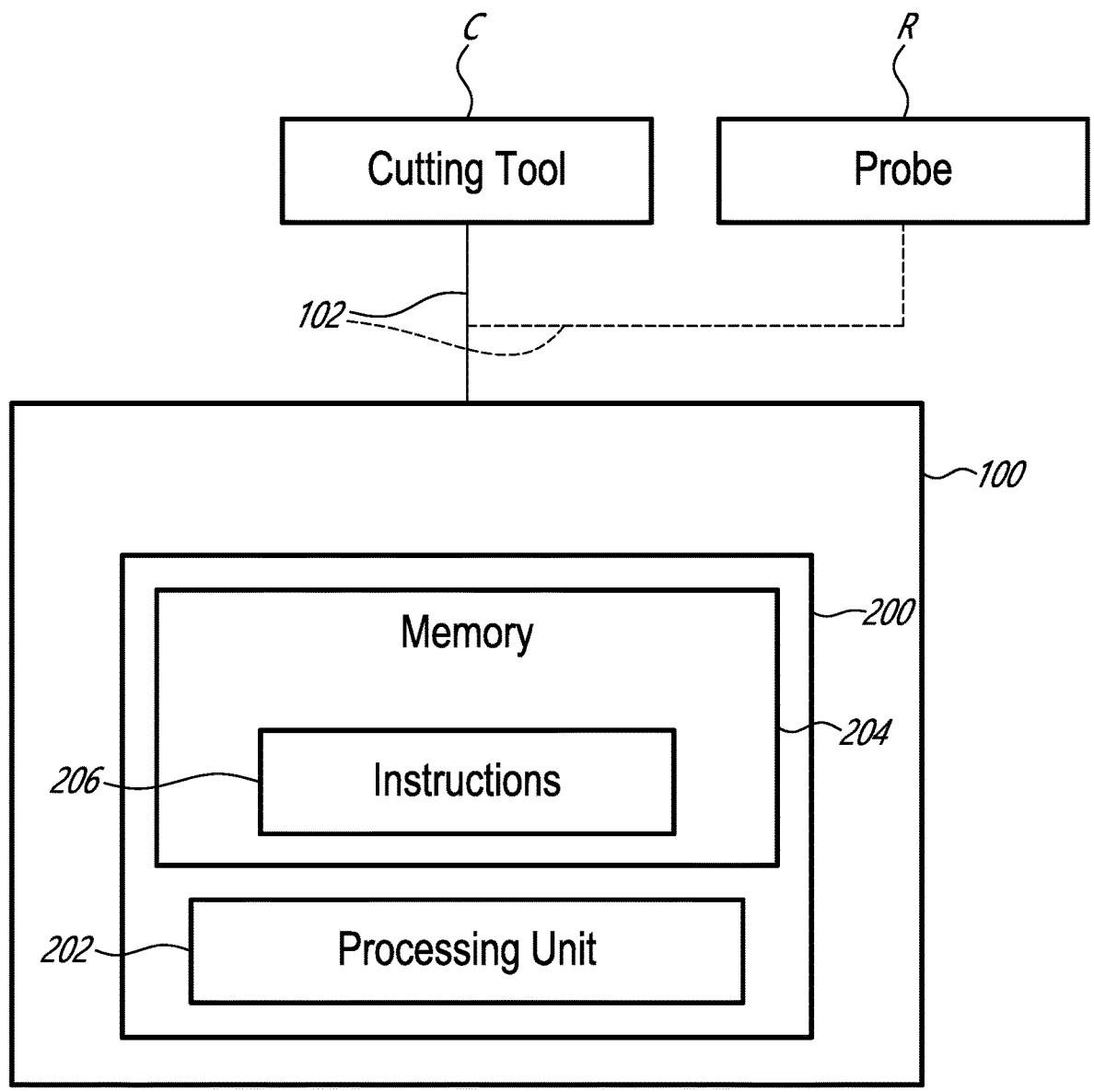
FIG. 2 is a schematic representation of a cutting machine.

Referring now to FIG. 2, a cutting machine is shown at 100. The cutting machine 100 includes a controller 200 for controlling movements of a cutting tool C held by a tool holder 102 of the cutting machine 100. The tool holder 102 is also operable to hold a probe R for probing a surface being machined by the cutting tool C as will be explained further below. The controller 200 comprises a processing unit 202 and a memory 204 which has stored therein computer-executable instructions 206.

Figure 3:
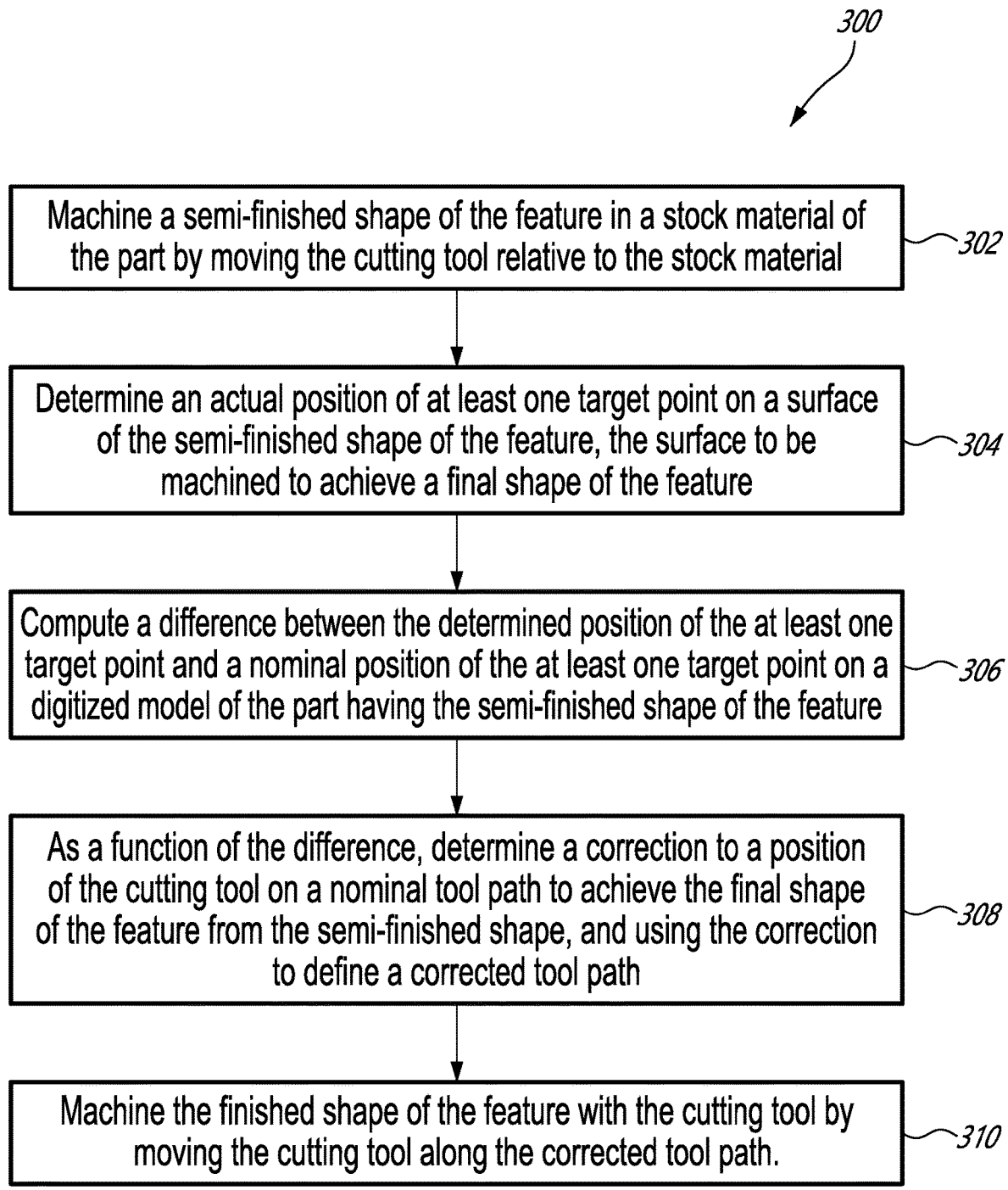
FIG. 3 is a flow chart illustrating steps of a method of manufacturing a feature in a part of the aircraft engine of FIG. 1 to be executed by the cutting machine of FIG. 2.
Figure 4:
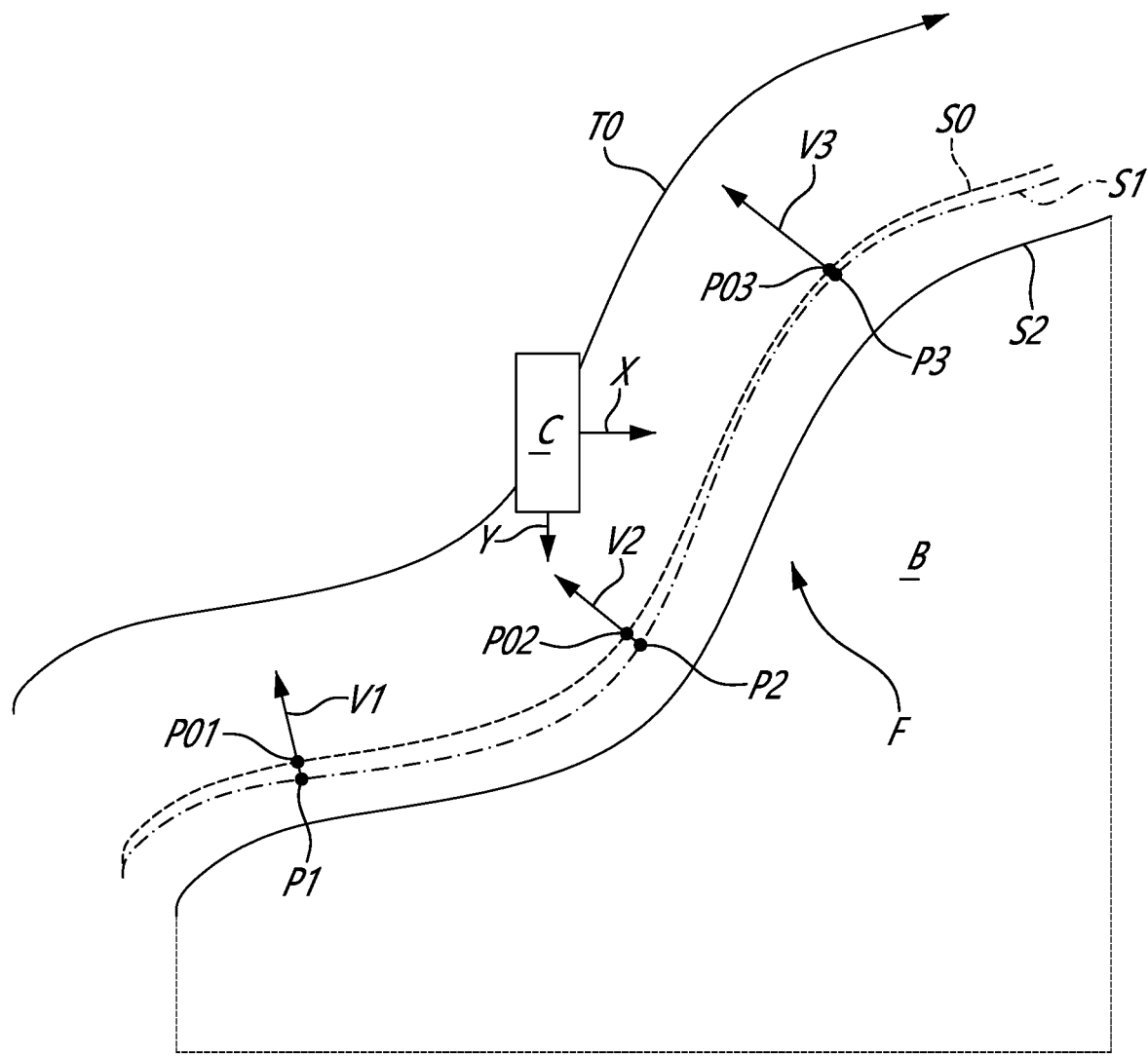
FIG. 4 is a schematic view illustrating the part with a cutting tool movable along a tool path to manufacture the feature and illustrating semi-finished and finished shapes of the feature.

Referring now to FIGS. 3-4, a method of manufacturing a feature F in a part B of the gas turbine engine 10 with the cutting machine 100 equipped with the cutting tool C is shown generally at 300. The feature F may be any shapes such as, for instance, an airfoil profile, the teeth/grooves of the spline coupling, and so on. The processing unit 202 of the controller 200 may comprise any suitable devices configured to implement the method 300 such that instructions 206, when executed by the controller 200 or other programmable apparatus, may cause the functions/acts/steps performed as part of the method 300 as described herein to be executed.

The method 300 comprises machining a semi-finished shape of the feature F in a stock material of the part B by moving the cutting tool C relative to the stock material at 302. This step of machining the semi-finished shape may comprise machining a shape that is similar to the finished shape, but that is offset from the finished shape. For instance, in the embodiment shown, this may be done by performing a first pass with the cutting tool C following a first tool path T0 at a first depth that is less than a final depth to be achieved to obtain the finished shape of the feature. The expression "depth" refers herein to a thickness of material being removed by the cutting tool C. In FIG. 4, the cutting tool C may be programmed to remove a given thickness of material along the first tool path T0 to create a surface S1 that defines a semi-finished shape of the feature F. In the context of the present disclosure, the expression "finished" in finished shape does not necessarily imply that no more manufacturing is carried on the part P. For instance, the finished shape may still undergo further processing such as, for instance, surface treatment, polishing, coating and so non. The expression "finished" denotes that the manufacturing step using the cutting tool C may be completed. But, subsequent steps using another cutting tool may follow.

As shown in FIG. 4, differences are present between the surface S1 of the semi-finished shape of the feature and an expected or nominal surface S0 of the semi-finished shape of the feature. This nominal surface S0 represents the shape of the surface that was supposed to be obtained and as planned using a digitized simulation of the first pass of the cutting tool C along the first tool path T0. These differences may be caused by the position of the cutting tool C being different than expected, movements of the cutting tool C being offset from what was originally planed, manufacturing tolerances of the cutting tool, wear and tear on cutting edges of the cutting tool, and so on. Data about the nominal surface S0 may be obtained from a digitized model of the part B having the semi-finished shape of the feature F.

The method 300 may then comprise determining an actual position of at least one target point, three target points P1, P2, P3 in the embodiment shown, but more or less may be used, on the actual surface S1 of the semi-finished shape of the feature F that was machined by the cutting tool C along the first tool path T0 at 304. The actual surface S1 that defines the target points P1, P2, P3 is to be further machined by the cutting tool C to achieve the finished shape of the feature F, which is denoted in FIG. 3 by the finished surface S2.

The method 300 includes computing differences between the determined positions of the target points P1, P2, P3 and nominal positions of nominal target points P01, P02, P03 on the digitized model of the part B having the semi-finished shape of the feature F at 306. The nominal target points P01, P02, P03 corresponds to the target points on the digitized model. These differences may correspond to distances along vectors V1, V2, V3 being normal to the actual surface S1 of the semi-finished shape of the feature and at the target points P1, P2, P3. These vectors V1, V2, V3 may extend from the target points P1, P2, P3 on the actual surface S1 of the semi-finished shape of the feature F to the nominal target points P01, P02, P03 on the nominal surface S0 of the semi-finished shape of the feature from the digitized model.

The method 300 then includes, as a function of the differences, determining corrections to positions of the cutting tool C on a nominal tool path to achieve the final shape of the feature F from the semi-finished shape, and using the corrections to define a corrected tool path for the cutting tool C at 308. For instance, the nominal tool path may require the cutting tool C to remove material from the stock material of the part B up to a certain nominal depth for each of the target points P1, P2, P3. However, maybe too much or too little material was removed by the first pass of the cutting tool C along the first tool path T0. This implies that locations where too much material was removed, the cutting tool C needs to remove less material, and where too little material was removed, the cutting tool C needs to remove more material to obtain the final shape of the feature F. The corrected tool path therefore includes data about movements of the cutting tool C to follow to machine the surface S1 of the semi-finished feature F to obtain the finished surface S2 of the feature.

At which point, the method 300 includes machining the final shape of the feature F with the cutting tool C by moving the cutting tool C along the corrected tool path at 310. The cutting tool C may be moved along the corrected tool path to remove corrected amount of material from the stock material of the part B. For instance, too much material was removed at a first target point P1 of the target points P1, P2, P3 since the position of the first target point P1 is closer to the finished surface S2 of the finished shape of the feature F than a first nominal target point P01 of the nominal target points P01, P02, P03. The corrected tool path may therefore require the cutting tool C to be inserted in the stock material at a corrected depth that may be less than a nominal depth.

For better understanding, we assume that the cutting tool C is movable along axes X and Y. The corrected tool path includes a corrected movement of the cutting tool C to remove less material as was originally planed at, for instance, a second target point P2 of the target points P1, P2, P3. This correction therefore includes both a correction along the X axis and a correction along the Y axis.

In the embodiment shown, the determining of the corrections at 308 may include determining the correction from a compensation table that lists correction values to apply to the position of the cutting tool associated with difference values between the actual and nominal positions of the target points P1, P2, P3, P01, P02, P03. An example of the compensation table is shown below. It will be appreciated that the compensation table may instead be a compensation graph.

| Differences between actual and nominal positions | Correction of the cutting tool along the X axis (ΔX) | Correction of the cutting tool along the Y axis (ΔY) |
| --- | --- | --- |
| −0.0020 | 0.0019 | 0.0017 |
| −0.0018 | 0.0017 | 0.0016 |
| ... | ... | ... |

It will be appreciated that a similar table is stored for each of the target points P1, P2, P3. Moreover, the compensation table may further have a correction along a third axis normal to both of the X and Y axes when the cutting tool C moves in three dimensions.

The compensation table is used by the cutting machine 100 (FIG. 2), and may be stored on the memory 204, to correlate movements of the cutting tool C along the X and Y axes with depth variations of the cutting tool C inside the stock material of the part B; the depth variations being taken along the vectors V1, V2, V3. For example, if the second target point P2 is spaced apart from the second nominal target point P02 along the second vector V2 by 1 mm, it implies that the movement of the cutting tool C along the nominal tool path has to corrected by ΔX and ΔY along the X and Y axes to obtain the proper depth on the finished shape of the feature F denoted by the surface S2 on FIG. 4. The compensation table is therefore used because the movements of the cutting tool C are required in both the X and Y axes to remove material from the stock material of the part B along the second vector V2.

Figure 5:
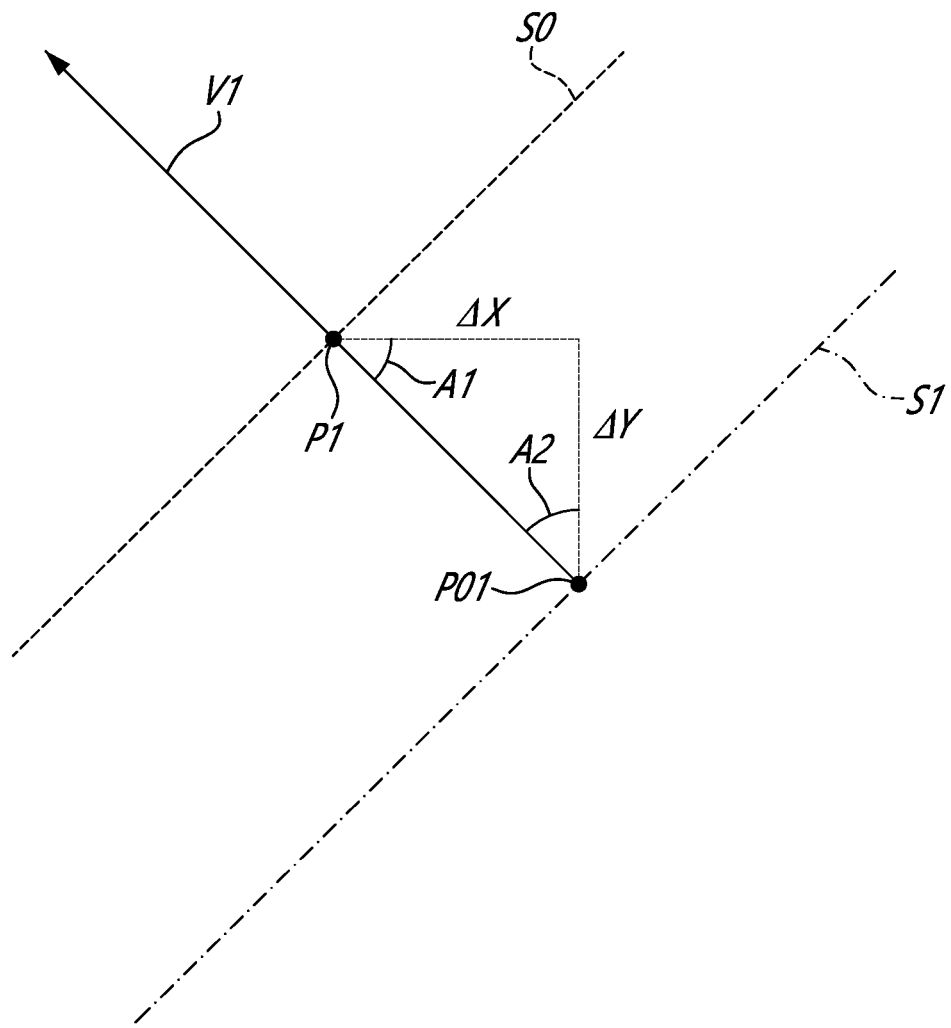
FIG. 5 is an enlarged view of a portion of FIG. 4.

Referring now to FIG. 5, an enlarged view of the first actual and nominal target points P1, P01 is presented. A compensation table may be generated for each of the target points P1, P2, P3. The compensation table may be generated using the digitized model of the part having the semi-finished shape of the feature F. For each of the target points P1, P2, P3, the vectors V1, V2, V3 normal to the surface S1 of the semi-finished shape of the feature F at the target points P1, P2 P3 is determined. Then, a range of acceptable values of differences between the nominal target points P01, P02, P03 and the actual target points P1, P2, P3 is discretized in a given number of intervals. For instance, if a difference from −0.002 mm to +0.002 mm is acceptable, this range may be divided in twenty values (e.g., −0.0020, −0.0018, −0.0016, . . . , +0.0018, +0.0020). If the differences is outside this range, this may be indicative of another manufacturing problem requiring further investigation. For instance, this may be indicative of the cutting tool C being broken, dull, etc. A signal may then be sent by the controller 200 to a user of the cutting machine 100 to notify the user of the problem.

For each of these difference values, correction values are determined as a function of a projection of the vectors V1, V2, V3 onto each possible of directions of movements of the cutting tool C. For instance, the correction of the cutting tool C along the X axis, ΔX, is calculated by projecting the vectors V1, V2, V3 on the X axis, and the correction of the cutting tool C along the Y axis, ΔY, is calculated by projecting the vectors V1, V2, V3 on the Y axis. In the embodiment shown, the correction along the X axis, ΔX, may be done by multiplying the distances along the vectors V1, V2, V3 between the actual and nominal target points P1, P2, P3, P01, P02, P03 by the cosine of a first angle A1 between the vectors V1, V2, V3 and the X axis. The correction along the Y axis, ΔY, may be done by multiplying the distances along the vectors V1, V2, V3 between the actual and nominal target points P1, P2, P3, P01, P02, P03 by the cosine of a second angle A2 between the vectors V1, V2, V3 and the Y axis. This is done for each of the possible difference values of the intervals. Hence, the compensation table contains data about what corrections to apply to the cutting tool C along both of the X and Y axes as a function of the offset from the nominal and actual target points to obtain the final shape, denoted by the surface S2 on FIG. 4, of the desired feature F.

Referring now to FIGS. 2-5, during the machining process, the cutting machine 100 moves the cutting tool C along the first tool path T0 (FIG. 4) to machine the semi-finished shape of the feature F; the semi-finished shape being denoted by the surface S1 on FIG. 3. At which point, the cutting machine 100 may release the cutting tool T, which is held in its tool holder 102, and grab a probe R with the tool holder 102. The probe R may therefore be moved along the surface S1 to probe each of the actual target points P1, P2, P3 on the surface S1. At which point, data about the positions (e.g., along the X and Y axes) of the actual target points P1, P2, P3 is stored by the controller 200 of the cutting machine 100. The controller 200, which may contain data about the positions (e.g., along the X and Y axis) of the nominal target points P01, P02, P03, computes differences between the positions of the nominal and actual target points P01, P02, P03, P1, P2, P3. For each of these computed differences, the controller 200 determines corrections values to apply to the nominal tool path of the cutting tool C to obtain the corrected tool path. These corrections may be determined by reading the compensation tables of each of the target points P1, P2, P3 and that may be stored in the controller 200. The cutting machine 100 may then release the probe R and grab the cutting tool C and move the cutting tool C along the corrected tool path to machine the finished shape of the feature, which is denoted by surface S2 on FIG. 4. If the actual distances are not listed in the compensation tables, the corrections may be computed by interpolating (e.g., linear interpolation, polynomial interpolation, etc) the data listed in the compensation table.

EXAMPLE

Splines

Referring back to FIG. 1, each of the low-pressure compressor 14B, the high-pressure compressor 14A, the low-pressure turbine 18B, and the high-pressure turbine 18A may be drivingly engaged to a corresponding one of the low-pressure shaft 21 and high-pressure shaft 20 using a spline connection. Also, a similar spline connection may be defined between the low-pressure shaft 21 and the gearbox 30 and/or between the gearbox 30 and the accessory 22.

Figure 6:
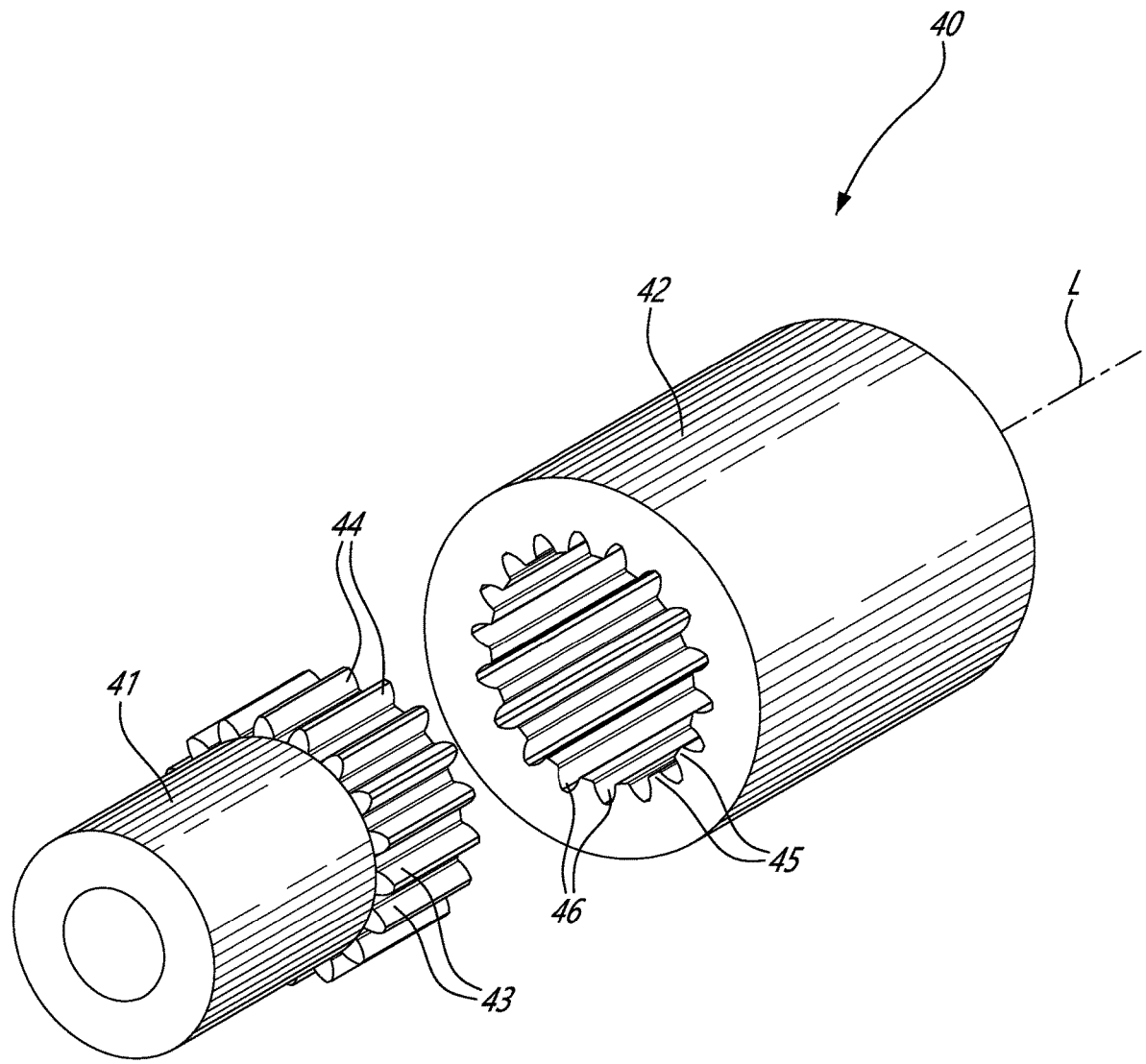
FIG. 6 is a three dimensional view of a spline connection in accordance with one embodiment to be used to connect two components of the aircraft engine of FIG. 1.

Referring now to FIG. 6, an exemplary spline connection is shown at 40. The spline connection 40 includes a male member 41 and a female member 42. The male member 41 includes a plurality of outer teeth 43 and outer grooves 44 whereas the female member 42 includes plurality of inner teeth 45 and inner grooves 46. Each of those teeth and grooves extend longitudinally along a longitudinal axis L of the spline connection 40. The male member 41 is slidably received inside the female member 42 until each of the outer teeth 43 is received within a respective one of the inner grooves 46 and until each of the inner teeth 45 is received within a respective one of the outer grooves 44.

Referring now to FIG. 7, the outer teeth 43 and the outer grooves 44 may be machined with a cutting tool 50 having a shape corresponding to a negative of the outer grooves 44. For each of the outer grooves 44, the cutting tool 50 may be moved in relationship to the male member 41 along a direction D1, which may be substantially radial relative to a longitudinal axis L of the male member 41. The outer teeth 43 and the outer grooves 44 may be machined one after the other; the male member 41 being rotated about the longitudinal axis L to machine each subsequent ones of the outer grooves 44.

The machining process described above with reference to FIGS. 2-5 is further described for the machining of features corresponding to the outer grooves 44 of the male member 41 of the spline connection 40. This process may be adapted to the inner grooves 46 of the female member 42.

Referring more particularly to FIG. 8, in the present case, the cutting tool 50 is movable solely in the direction D1. A semi-finished shape of the outer groove 44 is machined in a stock material of the male member 41 by moving the cutting tool 50 in the direction D1 relative to the stock material. This creates the surface SS1 of the semi-finished shape of the outer groove 44. Then, the actual positions of the target points P11, P12, P13, P14 on the surface SS1 is determined. This may be done by probing the surface SS1 as explained above. Although four target points are used in this example, any suitable number of target points may be used. For instance, one, two, three, five, etc target points may be used. The differences between the actual positions of the target points P11, P12, P13, P14 and the nominal positions of the target points are determined. As explained above, the nominal positions is determined from a digitized model of the male member 41 of the spline connection 40 having the semi-finished shape of the outer groove 44. At which point, the correction to the position of the cutting tool 50 on a nominal tool path to achieve the final shape of the outer groove 44, which is denoted by the surface SS2, is determined to obtain a corrected tool path. Then, the finished shape of the outer groove 44 may be machined using the cutting tool 50 moved along the corrected tool path.

As previously explained, the determining of the corrections may include reading the compensation tables for each of the target points P11, P12, P13, P14. For a first target point P11 of the target points P11, P12, P13, P14, the compensation table may include data correlating values of distances between the nominal and actual target points P011, P11 along a vector V11 normal to the surface SS1 and at the first target point P11 and corrections to apply to the cutting tool 50 along the direction D1. In other words, because the vector V11 is not parallel to the direction D1 of the cutting tool 50, movements of the cutting tool 50 along the direction D1 to achieve the desired final shape of the outer groove 44 is affected by the angle between the vector V11 and the direction D1. For example, if the angle between the vector V11 and the direction D1 of the cutting tool is 45 degrees and if the distance between the nominal and actual positions of the first target point P11 is 1 mm, the movement of the cutting tool 50 along the direction D1 needs to be altered by 1 mm×cos(45 degrees). The compensation table stores corrections to apply for a plurality of possible distances between nominal and actual positions of the target points. If the actual distance is not listed in the compensation table, the correction may be computed by interpolation (e.g., linear interpolation, polynomial interpolation, etc).

In other words, after the machining of the semi-finished shape of the outer groove 44, which is defined by the surface SS1, the position of at least one target point P11 is determined. The offset between the actual position of the at least one target point P11 and the expected or nominal position of the at least one nominal target point P011 is computed. As explained above, this offset may be caused by many factors such as a different position of a cutting edge of the cutting tool 50 than expected. In FIG. 8, the actual position of the at least one target point P11 is deeper in the stock material than the nominal position of the at least one nominal target point P011. This implies that the cutting tool 50 was penetrated in the stock material deeper than originally planned. This increased in depth is therefore subtracted from the nominal tool path to obtain the corrected tool path. Hence, when machining the finished shape of the outer groove 44, which defines the finished surface SS2, the cutting tool 50 is inserted in the stock material at a corrected depth that is less than a nominal depth to account for the excessive machine depth when machining the semi-finished shape.

The disclosed method 300 may allow the control of shaping process by probing a set of discrete points and compare them to a predefined compensation table to read the correction of the cutter position relative to the part in order the cancel the deviation of the profile in the finishing cut. This may allow a control of process without complicated measuring methods and calculation. This method 300 may be carried as a process control in closed door mode. The method 300 may: enable to control the cutting process in closed door mode using in-process measurement; enable to increase quality and productivity; enable producing complex shape using pre-computed data and measurement; enable to simplify in-process quality control for these type of machining; enable to correct the process without complex calculation; and improve process capability.

Controller

The processing unit 202 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The data about the positions of the nominal target points P01, P02, P03, the compensation tables, the positions of the actual target points P1, P2, P3 may be stored in the memory 204 of the controller 200.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

The methods and systems for machining a feature described herein may be implemented in a high level procedural or object oriented programming or scripting language, or a combination thereof, to communicate with or assist in the operation of a computer system, for example the controller 200. Alternatively, the methods and systems for machining a feature may be implemented in assembly or machine language. The language may be a compiled or interpreted language. Program code for implementing the methods and systems for machining a feature may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for machining a feature may also be considered to be implemented by way of a non-transitory computer-readable storage medium having a computer program stored thereon. The computer program may comprise computer-readable instructions which cause a computer, or more specifically the processing unit 202 of the controller 200, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a feature in a part of an aircraft engine with a cutting tool, comprising:
    machining a semi-finished shape of the feature in a stock material of the part by moving the cutting tool relative to the stock material;
    determining an actual position of at least one target point on a surface of the semi-finished shape of the feature, the surface to be machined to achieve a final shape of the feature;
    computing a difference between the determined position of the at least one target point and a nominal position of the at least one target point, the nominal position obtained from a digitized model of the part having the semi-finished shape of the feature;
    as a function of the difference, determining a correction to a position of the cutting tool on a nominal tool path to achieve the final shape of the feature from the semi-finished shape, and using the correction to define a corrected tool path; and
    machining the finished shape of the feature with the cutting tool by moving the cutting tool along the corrected tool path.

2. The method of claim 1, wherein the determining of the correction includes determining the correction from a compensation table listing correction values to apply to the position of the cutting tool associated with difference values between actual and nominal positions of the at least one target point.

3. The method of claim 2, comprising, for each of the at least one target point, generating the compensation table by:
    determining a vector normal to the surface of the semi-finished shape of the feature at the at least one target point from the digitized model of the part having the semi-finished shape of the feature; and
    for each of the difference values taken along the vector normal to the surface, determining the correction values as a function of a projection of the vector onto each directions of movement of the cutting tool.

4. The method of claim 2, wherein the determining of the correction includes determining the correction by interpolation from the compensation table.

5. The method of claim 1, wherein the determining of the actual position of the at least one target point includes determining the actual position of the at least one target point with a probe.

6. The method of claim 5, comprising substituting the probe for the cutting tool in a tool holder of a cutting machine.

7. The method of claim 1, wherein the feature is a groove in a member of a spline connection, the machining of the semi-finished of the feature includes moving the cutting tool in a radial direction relative to a longitudinal axis of the member of the spline connection.

8. The method of claim 7, wherein the determining of the correction of the position of the cutting tool includes determining the correction of a movement of the cutting tool along the radial direction as a function of the difference between the determined position of the at least one target point and the nominal position of the at least one target point.

9. The method of claim 1, wherein the determining of the correction includes determining the correction as a function of a distance between the determined position of the at least one target point and the nominal position of the at least one target point along a vector normal to the surface of the semi-finished shape at the at least one target point and as a function of an angle between the vector and a direction of a movement of the cutting tool.

10. The method of claim 9, wherein the machining of the finished shape includes moving the cutting tool in the radial direction along a corrected depth in the stock material, the corrected depth corresponding to a nominal depth corrected by the correction.

11. A cutting machine comprising:
    a tool holder holding a cutting tool; and
    a controller having a processing unit and a computer readable medium having instructions stored thereon executable by the processing unit for:
        machining a semi-finished shape of a feature in a stock material of a part by moving the cutting tool relative to the stock material;

determining an actual position of at least one target point on a surface of the semi-finished shape of the feature, the surface to be machined to achieve a final shape of the feature;

computing a difference between the determined position of the at least one target point and a nominal position of the at least one target point on a digitized model of the part having the semi-finished shape of the feature;

as a function of the difference, determining a correction to a position of the cutting tool on a nominal tool path to achieve the final shape of the feature from the semi-finished shape, and using the correction to define a corrected tool path; and machining the finished shape of the feature with the cutting tool by moving the cutting tool along the corrected tool path.

12. The cutting machine of claim 11, wherein the determining of the correction includes determining the correction from a compensation table listing correction values to apply to the position of the cutting tool associated with difference values between actual and nominal positions of the at least one target point.

13. The cutting machine of claim 12, comprising, for each of the at least one target point, generating the compensation table by:

determining a vector normal to the surface of the semi-finished shape of the feature at the at least one target point from the digitized model of the part having the semi-finished shape of the feature; and for each of the difference values taken along the vector normal to the surface, determining the correction values as a function of a projection of the vector onto each directions of movement of the cutting tool.

14. The cutting machine of claim 12, wherein the determining of the correction includes determining the correction by interpolation from the compensation table.

15. The cutting machine of claim 11, wherein the determining of the actual position of the at least one target point includes determining the actual position of the at least one target point with a probe.

16. The cutting machine of claim 15, comprising substituting the probe for the cutting tool in the tool holder of the cutting machine.

17. The cutting machine of claim 11, wherein the feature is a groove in a member of a spline connection, the machining of the semi-finished of the feature includes moving the cutting tool in a radial direction relative to a central axis of the member of the spline connection.

18. The cutting machine of claim 17, wherein the determining of the correction of the position of the cutting tool includes determining the correction of a movement of the cutting tool along the radial direction as a function of the difference between the determined position of the at least one target point and the nominal position of the at least one target point.

19. The cutting machine of claim 11, wherein the determining of the correction includes determining the correction as a function of a distance between the determined position of the at least one target point and the nominal position of the at least one target point along a vector normal to the surface of the semi-finished shape at the at least one target point and as a function of an angle between the vector and a direction of a movement of the cutting tool.

20. The cutting machine of claim 19, wherein the machining of the finished shape includes moving the cutting tool in the radial direction along a corrected depth in the stock material, the corrected depth corresponding to a nominal depth corrected by the correction.

\* \* \* \* \*